(12) United States Patent
Kurniawati et al.

(10) Patent No.: US 11,227,601 B2
(45) Date of Patent: Jan. 18, 2022

(54) COMPUTER-IMPLEMENT VOICE COMMAND AUTHENTICATION METHOD AND ELECTRONIC DEVICE

(71) Applicant: Merry Electronics(Shenzhen) Co., Ltd., ShenZhen (CN)

(72) Inventors: Evelyn Kurniawati, Taichung (TW); Sasiraj Somarajan, Taichung (TW)

(73) Assignee: Merry Electronics(Shenzhen) Co., Ltd., ShenZhen (CN)

( * ) Notice: Subject to any disclaimer, the term of this patent is extended or adjusted under 35 U.S.C. 154(b) by 284 days.

(21) Appl. No.: 16/578,287

(22) Filed: Sep. 21, 2019

(65) Prior Publication Data
US 2021/0090577 A1 Mar. 25, 2021

(51) Int. Cl.
*G10L 17/00* (2013.01)
*G10L 17/06* (2013.01)
(Continued)

(52) U.S. Cl.
CPC .............. *G10L 17/00* (2013.01); *G10L 17/02* (2013.01); *G10L 17/06* (2013.01); *G10L 17/08* (2013.01);
(Continued)

(58) Field of Classification Search
CPC ......... G10L 17/00; G10L 17/06; G10L 17/02; G10L 17/08; G10L 17/04; G10L 17/12; G10L 25/24; G10L 25/84
See application file for complete search history.

(56) References Cited

U.S. PATENT DOCUMENTS 10,347,238 B2 * 7/2019 Jin ..................... G11B 27/022
2017/0351487 A1 * 12/2017 Aviles-Casco Vaquero ............... G06F 3/167
(Continued)

OTHER PUBLICATIONS

H. Ren, Y. Song, S. Yang and F. Situ, "Secure smart home: A voiceprint and internet based authentication system for remote accessing," 2016 11th International Conference on Computer Science & Education (ICCSE), 2016, pp. 247-251, doi: 10.1109/ICCSE.2016.7581588. (Year: 2016).*
(Continued)

*Primary Examiner* — Michelle M Koeth
(74) *Attorney, Agent, or Firm* — JCIPRNET

(57) ABSTRACT

A computer-implement voice command authentication method is provided. The method includes obtaining a sound signal stream; calculating a Signal-to-Noise Ratio (SNR) value of the sound signal stream; converting the sound signal stream into a Mel-Frequency Cepstral Coefficients (MFCC) stream; calculating a Dynamic Time Warping (DTW) distance corresponding to the MFCC stream according to the MFCC stream and one of a plurality of sample streams generated by the Gaussian Mixture Model with Universal Background Model (GMM-UBM); calculating, according to the MFCC stream and the sample streams, a Log-likelihood ratio value corresponding to the MFCC stream as a GMM-UBM score; determining whether the sound signal stream passes a voice command authentication according to the GMM-UBM score, the DTW distance and the SNR value; in response to determining that the sound signal stream passes the voice command authentication, determining that the sound signal stream is a voice stream spoken from a legal user.

16 Claims, 7 Drawing Sheets

(51) Int. Cl.
G10L 25/24 (2013.01)
G10L 25/84 (2013.01)
G10L 17/02 (2013.01)
G10L 17/08 (2013.01)
G10L 17/04 (2013.01)
G10L 17/12 (2013.01)

(52) U.S. Cl.
CPC .............. G10L 25/24 (2013.01); G10L 25/84 (2013.01); *G10L 17/04* (2013.01); *G10L 17/12* (2013.01)

(56) References Cited

U.S. PATENT DOCUMENTS

2019/0051299 A1* 2/2019 Ossowski ............... G10L 15/08
2019/0304468 A1* 10/2019 Khoury .................. G10L 17/08

OTHER PUBLICATIONS

Muda et al., "Voice Recognition Algorithms using Mel Frequency Cepstral Coefficient (MFCC) and Dynamic Time Warping (DTW) Techniques," Journal of Computing, vol. 2, Issue 3, Mar. 2010, arXiv:1003.4083v1 [cs.MM] (Year: 2010).*
Feng et al., "Continuous Authentication for Voice Assistants," arXiv:1701.04507v1 [cs.CR], Jan. 17, 2017 (Year: 2017).*
Evelyn Kurniawati, et al., "Combination of GMM-UBM and DTW for Voice Command Authentication System," Proc SPIE 11071, Tenth International Conference on Signal Processing Systems, Apr. 2019, pp. 1-6.

* cited by examiner

COMPUTER-IMPLEMENT VOICE COMMAND AUTHENTICATION METHOD AND ELECTRONIC DEVICE

BACKGROUND

Technical Field

The disclosure relates to an electronic apparatus, and a computer-implement method for the same, and, more particularly, to a computer-implement voice command authentication method for determining whether a sound signal stream of a received voice command is coming from a legal user or an illegal user and the electronic using the same.

Description of Related Art

A Universal Background Model (UBM) is a model used in a biometric verification system to represent general, person-independent feature characteristics to be compared against a model of person-specific feature characteristics when making an accept or reject decision. For example, in a speaker verification system, the UBM is a speaker-independent Gaussian Mixture Model (GMM) trained with speech samples from a large set of speakers to represent general speech characteristics. Using a speaker-specific GMM trained with speech samples from a particular enrolled speaker, a likelihood-ratio test for an unknown speech sample can be formed between the match score of the speaker-specific GMM model and the UBM. In other words, the unknown speech sample can be authenticated by using a method of foregoing GMM-UBM (Gussian Mixture Model with Universal Background Model).

SUMMARY

A computer-implement voice command authentication method and an electronic device using the same provided by the presented invention are capable of performing an authentication procedure on an obtained sound signal stream of a voice command according to a corresponding GMM-UBM score, Dynamic Time Warping (DTW) distance and Signal-to-Noise Ratio (SNR) value, such that the accuracy of the authentication for the voice command would be improved.

According to a concept of the present invention, a computer-implement voice command authentication method is provided. The computer-implement voice command authentication method includes obtaining a sound signal stream; calculating a Signal-to-Noise Ratio (SNR) value of the sound signal stream; converting the sound signal stream into a Mel-Frequency Cepstral Coefficients (MFCC) stream; calculating a Dynamic Time Warping (DTW) distance corresponding to the MFCC stream according to the MFCC stream and one of a plurality of sample streams generated by the Gaussian Mixture Model with Universal Background Model (GMM-UBM); calculating, according to the MFCC stream and the sample streams, a Log-likelihood ratio (LLR) value corresponding to the MFCC stream as a GMM-UBM score corresponding to the sound signal stream; determining whether the sound signal stream passes a voice command authentication according to the GMM-UBM score, the DTW distance and the SNR value; in response to determining that the sound signal stream passes the voice command authentication, determining that the sound signal stream is a voice stream spoken from a legal user; and in response to determining that the sound signal stream does not pass the voice command authentication, determining that the sound signal stream is the voice stream spoken from an illegal user.

According to yet another concept of the present invention, an electronic device is provided. The electronic device includes a microphone device, a storage device and a processor. The microphone device receives sounds to generate a sound signal stream. The storage device is configured to store programs and a plurality of sample streams generated by the Gaussian Mixture Model with Universal Background Model (GMM-UBM). The processor is configured to execute the programs to implement a voice command authentication method, wherein the processor calculates a Signal-to-Noise Ratio (SNR) value of the sound signal stream, converts the sound signal stream into a Mel-Frequency Cepstral Coefficients (MFCC) stream. Furthermore, the processor calculates according to the MFCC stream and the sample streams, a Log-likelihood ratio (LLR) value corresponding to the MFCC stream as a GMM-UBM score corresponding to the sound signal stream, wherein the processor further calculates a Dynamic Time Warping (DTW) distance corresponding to the MFCC stream according to the MFCC stream and one of the sample streams. Then, the processor determines whether the sound signal stream passes a voice command authentication according to the GMM-UBM score, the DTW distance and the SNR value, wherein in response to determining that the sound signal stream passes the voice command authentication, the processor determines that the sound signal stream is a voice stream spoken from a legal user, wherein in response to determining that the sound signal stream does not pass the voice command authentication, the processor determines that the sound signal stream is the voice stream spoken from an illegal user.

Based on the foregoing embodiment, the provided computer-implement voice command authentication method and the electronic device using the same are capable of calculating a SNR of the obtained sound signal stream, calculating a LLR value as a GMM-UBM score corresponding to the sound signal stream according to the MFCC stream corresponding to the sound signal stream and the sample streams generated by GMM-UBM, and determining whether the sound signal stream is a voice stream spoken from a legal user or an illegal user by determining whether the sound signal stream passes a voice command authentication according to the GMM-UBM score, the corresponding DTW distance and the SNR value, such that the ability for resisting the noise in the sound signal stream would be increased and the accuracy of the authentication for the voice command (the sounds received by the microphone device) would be improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
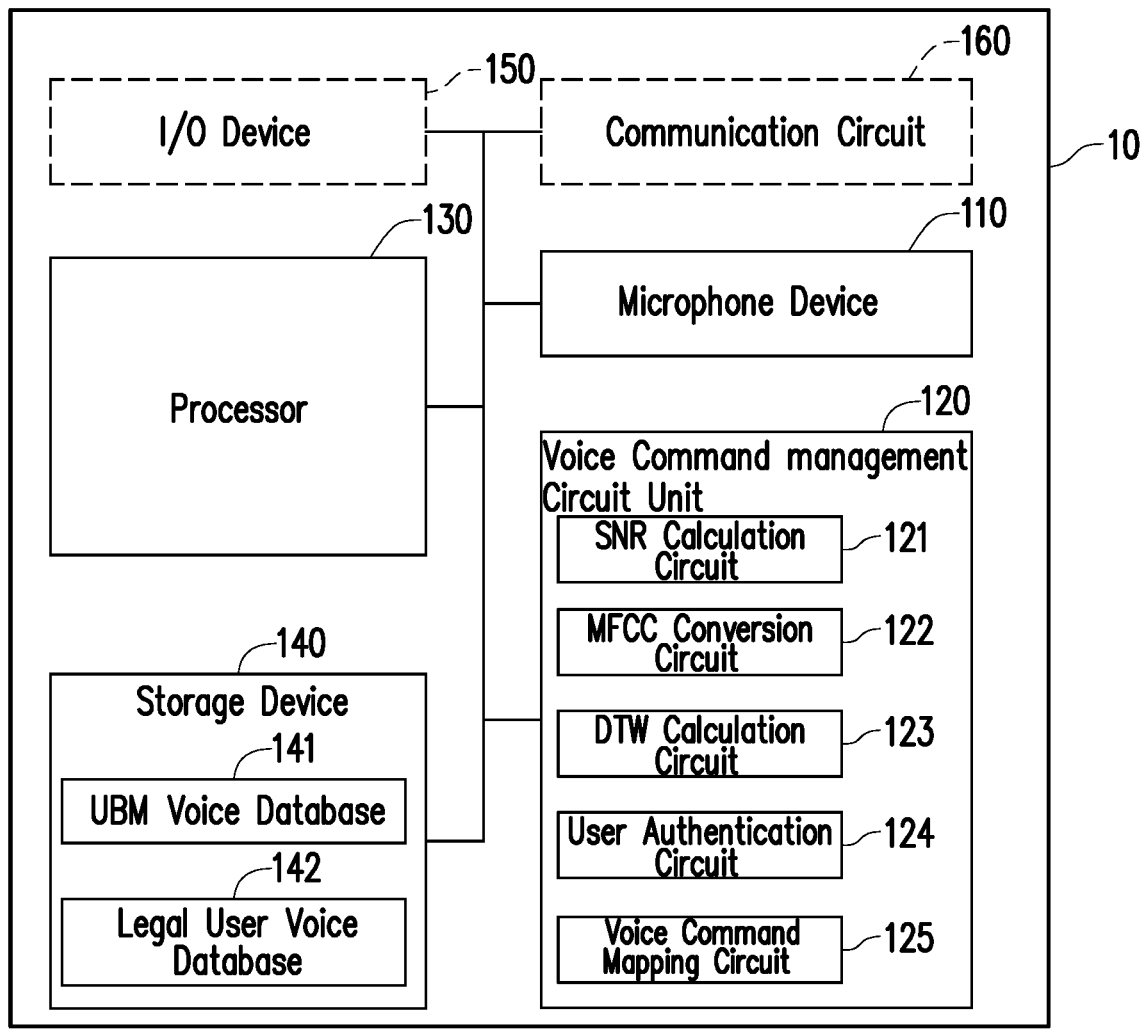
FIG. 1 shows a block diagram of an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

The proposed invention is an electronic device which uses the provided voice command method for performing an authentication procedure on the received sounds to determining whether the received sounds is corresponding to a voice command spoken from a legal user. The electronic device, for example, may be a smartphone, a virtual assistant (e.g., Google Assistant, or Siri of iOS/macOS), a vehicle central control device, a home automation system (e.g., Alexa of Amazon or other kinds of the electronic device which performs voice recognition on a coming/receiving sounds for executing related operation (e.g., voice control operation) on itself or/and on the other corresponding connected other electronic device.

FIG. 1 shows a block diagram of an electronic device according to an embodiment of the invention. Referring to FIG. 1, in the embodiment, the electronic device 10 includes a microphone device 110, a processor 130, a storage device 140. In a further embodiment, the electronic device 10 further includes an I/O device 150 and a communication circuit unit 160. In another further embodiment, the electronic device 10 further includes a voice command management circuit unit 120.

The microphone device 110 is configured to receive sounds and generate corresponding sound signal stream.

The storage device 140 (or non-transitory computer readable recording medium) is configured to store programs, user data and system data. Some of the programs are applications installed in the electronic device, and some of the programs are firmware/software/applications for managing the whole operations of electronic device (e.g., programs for implementing a voice command authentication using the voice command authentication method provided in the embodiment of the presented invention). User data refers to the data inputted or sent from the user of the electronic device or from other electronic devices. System data refers to data related to management operation performed on the electronic device 10. In the embodiment, the system data includes a UBM voice database 141 and a legal user voice database 142. The UBM voice database 141 records a plurality of different sample voices/speeches spoken from different users. In another embodiment, the UBM voice database 141 further records a plurality of different background sounds. Furthermore, the legal user voice database 142 records voices or speeches spoken from one or more legal users who have the control right to control the electronic device 10.

In the embodiment, the processor 130 may include central processing units (CPUs) of the electronic device 10 and, thus, control the overall operation of the electronic device 10. In certain embodiments, the processor 130 accomplishes this by loading software or firmware stored in the storage device 140, and executing the loaded software or firmware (e.g., the processor 130 is programmed), so as to implement the voice command authentication method provided in the embodiment as well. The processor 130 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The I/O device 150 includes an input device and an output device, wherein the input device is configured to generate input data or input instruction according to an input operation applied on the I/O device from a user. The generated input data or input instruction may be sent to processor 130, and the processor 130 may record the input data or perform an operation corresponding to the input instruction. The input device may include, for example, a plurality physical button, a keyboard, a mouse, a touch screen or other suitable input devices. The output device is configured to output media content (e.g., the image content, sound content, or the video content) according to the instruction sent from the processor. The output device may include, for example, a screen, a speaker, a projector, a printer, a touch screen or other suitable output device.

In the embodiment, the communication circuit unit 160 includes a wireless communication circuit module which is configured to support one of a Wireless Fidelity (WiFi) system and a Bluetooth communication technology or a combination thereof, but is not limited thereto. In addition, the communication circuit unit 160 may further include a network interface card (NIC) which is configured to establish a connection to internet or local network. In other words, the communication circuit unit 160 may establish a wire or wireless connection to the internet, local network and/or another electronic device. The processor 130 may receive data (e.g., a sound signal stream or other kinds of data) transmitted via the established connection from the internet, local network and/or another electronic device.

In another embodiment, the communication circuit unit 160 may further include a connection interface which is configured to connect to other electronic devices via physical connection wire. The connection interface can be a circuit interface that includes a plurality of ports, for example, a port conforming to the Video Graphics Array (VGA) standard, the Digital Visual Interface (DVI) standard, the High Definition Multimedia Interface (HDMI) standard, or other suitable standard. However, the disclosure is not limited thereto. For example, in a further embodiment, the connection interface may include a port compatible with the Universal Serial Bus (USB) standard or other suitable standard.

In an embodiment, the programs corresponding to the provided voice command authentication method may be implemented as a hardware circuit unit, e.g., the voice command management circuit unit 120. The voice command management circuit unit 120, for example, may include a SNR calculation circuit 121, a MFCC conversion circuit 122, a DTW calculation circuit 123, a user authentication circuit 124 and a voice command mapping circuit 125. The SNR calculation circuit 121 is configured to calculate a SNR corresponding to an inputted sound signal stream. The MFCC conversion circuit 122 is configured to converting an inputted sound signal stream into a MFCC sound signal stream (also referred to as MFCC stream). The DTW calculation circuit 123 is configured to calculate a DTW distance between an inputted sound signal stream and one of a plurality of sample streams. The user authentication circuit 124 is configured to perform an authentication on a sound signal stream corresponding to received sounds, so as to verify if the sounds is a voice command spoken from an authorized user (legal user). The voice command mapping circuit 125 is configured to map the sound signal stream to a recorded voice command, so as to perform corresponding operation according to the mapped voice command.

Figure 2:
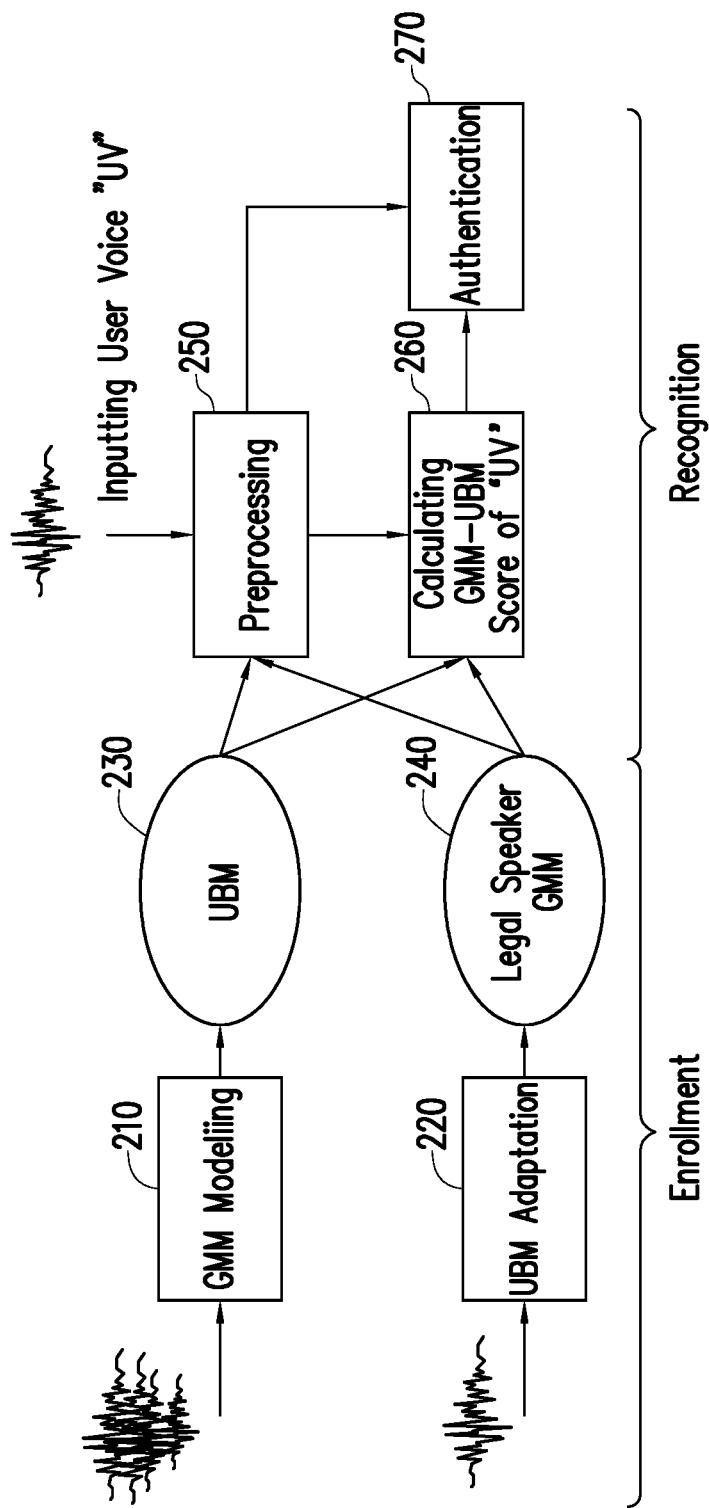
FIG. 2 shows a schematic diagram of the enrollment of a sample sound stream of a legal user by the GMM-UBM method and the corresponding recognition of an inputting user voice according to an embodiment of the invention.

FIG. 2 shows a schematic diagram of the enrollment of a sample sound stream of a legal user by the GMM-UBM method and the corresponding recognition of an inputting user voice according to an embodiment of the invention. Referring to FIG. 2, the enrollment of a sample sound stream of a legal user includes steps 210-240. In more detail, a plurality of speeches of various speakers (different users) are inputted into the GMM model (step 210) to generate a Universal Background Model (UBM) sample sound stream (also referred to as a first sample stream) (step 230). Furthermore, the speech of a legal speaker (legal user) is inputted, and the speech of the legal speaker is performed a UBM adaption via the generated UBM corresponding to the speeches of various speakers (step 220), so as to obtain another sample sound stream (also referred to as a second sample stream) via a further GMM modeling (step 240). In other words, the first sample stream is a speaker-independent GMM trained with speeches of large set of speakers and the first sample stream represents general speech characteristics. The second sample stream is a speaker-specific GMM trained with the speech of the legal speaker, and the second sample stream represents the speech characteristics of the legal user/speaker.

In another aspect, the recognition of an inputted user voice "UV" includes steps 250-270. In more detail, the microphone device 110 may receive sounds (e.g., inputted user voice "UV") and then generate corresponding sound signal stream. The generated sound signal stream would be sent to the processor 130 (or the voice command management circuit unit 120) for performing preprocesses (step 250). The preprocesses include but not limited, such as, a sound purifying operation, a SNR calculation on the sound signal stream, a MFCC conversion on the sound signal stream and a DTW distance calculation between the sound signal stream and one of the sample streams. Then, the processor 130 (or the voice command management circuit unit 120) calculates GMM-UBM score of "UV" according to the preprocessed sound stream (e.g., the MFCC stream obtained by converting the sound signal stream), the UBM sample stream (the first sample stream) and the legal speaker GMM sample stream (the second sample stream) (step 260). Next, the processor 130 (or the voice command management circuit unit 120) determine whether the inputted user voice "UV" is spoken from the legal user according to the calculated GMM-UBM score, the corresponding DTW distance and one or more corresponding thresholds (step 270). The one or more corresponding thresholds include at least one of a LLR threshold and an authentication threshold. It should be mention that the first sample stream may be stored in the UBM voice database 141, and the second sample stream may be stored in the Legal User Voice Database 142.

Figure 3:
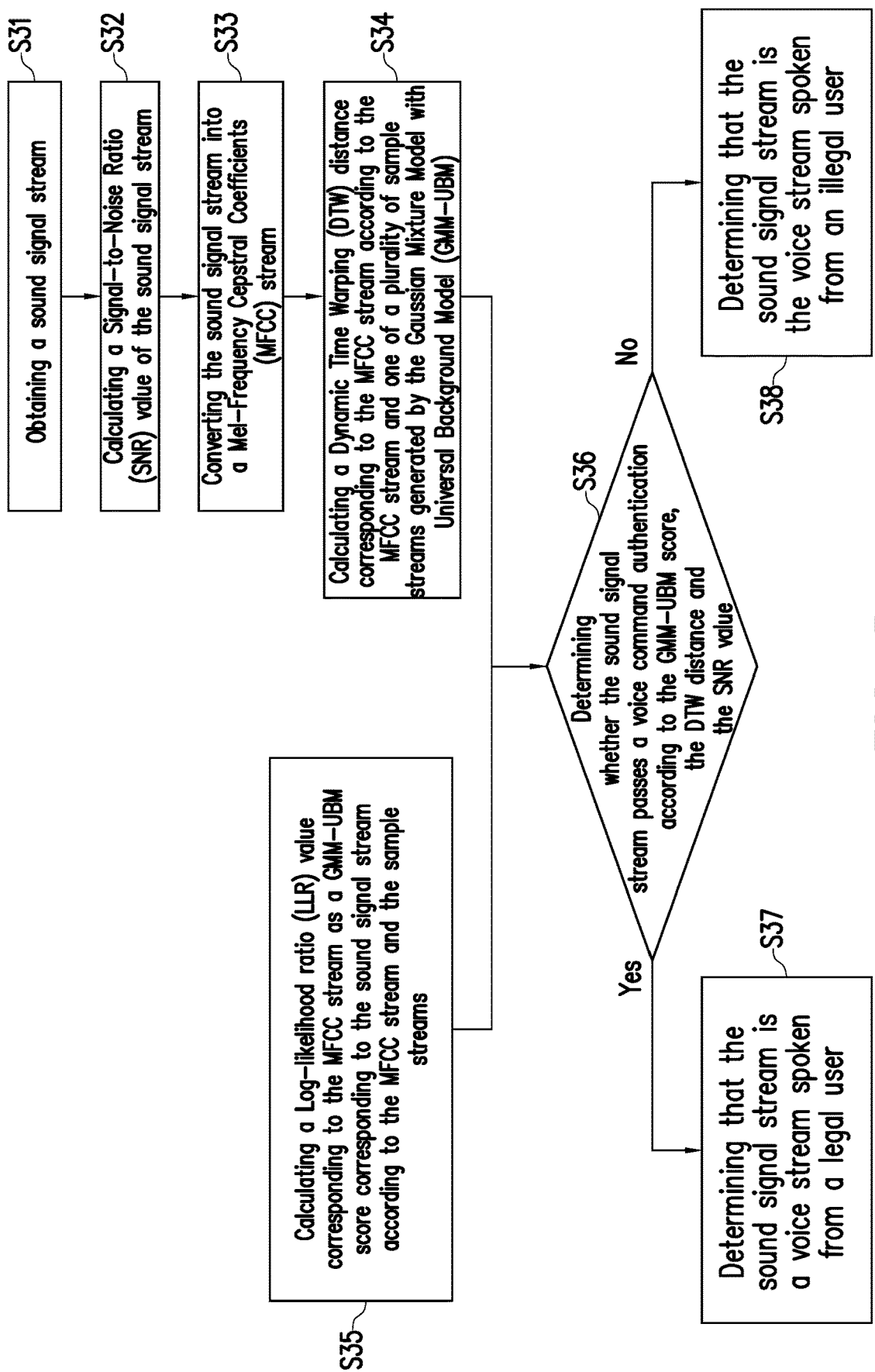
FIG. 3 shows a flow chart of a computer-implement voice command authentication method according to an embodiment of the invention.

FIG. 3 shows a flow chart of a computer-implement voice command authentication method according to an embodiment of the invention. Referring to FIG. 3, in step S31, the processor 130 (or the voice command management circuit unit 120) obtains a sound signal stream. Specifically, as mentioned above, the sound signal stream is obtained from the microphone device 110. In another embodiment, the communication circuit unit 160 may receive a sound signal stream via an established connection from another electronic device. For example, a user may speak to his or her smartphone which is connecting to the communication circuit unit 160 of the electronic device 10, the smartphone may transmit a corresponding sound signal stream to the communication circuit unit 160, and then the communication circuit unit 160 may send the received sound signal stream to the processor 130 (or the voice command management circuit unit 120).

Next, in step S32, the processor 130 (or the SNR calculation circuit 121) calculates a Signal-to-Noise Ratio (SNR) value of the sound signal stream. Since the calculation of the SNR of a sound signal stream is a well-known skill in this field and not the main concept of the presented invention, the related detail would be omitted hereto.

Next, in step S33, the processor 130 (or the MFCC conversion circuit 122) converts the sound signal stream into a Mel-Frequency Cepstral Coefficients (MFCC) stream. Since the MFCC conversion of a sound signal stream is a well-known skill in this field and not the main concept of the presented invention, the related detail would be omitted hereto.

Next, in step S34, the processor 130 (or the DTW calculation circuit 123) calculates a Dynamic Time Warping (DTW) distance corresponding to the MFCC stream according to the MFCC stream and one (e.g., the second sample stream) of the sample streams (e.g., the first and the second sample streams) generated by the Gaussian Mixture Model with Universal Background Model (GMM-UBM). Since the DTW distance calculation is a well-known technique for time series comparison of temporal features of two data stream and not the main concept of the presented invention, the related detail would be omitted hereto.

Next, in step S35, the processor 130 (or the user authentication circuit 124) calculates a Log-likelihood ratio (LLR) value corresponding to the MFCC stream as a GMM-UBM score corresponding to the sound signal stream according to the MFCC stream and the sample streams.

Specifically, the calculation is based on the formula (F1) below:

$$LLR = \frac{1}{T}\sum_{t=0}^{T-1} \{\log\ p(y_t\ |\ \Theta_{speaker}) - \log\ p(y_t\ |\ \Theta_{UBM})\} \quad (F1)$$

T represents the total amount of time frames of the MFCC stream; t represents the one of the time frame of the sound stream; $\Theta_{UBM}$ represents the feature value of UBM sample stream (the first sample stream) corresponding to specific time frame t; $\Theta_{speaker}$ represents the feature value of legal speaker GMM sample stream (the second sample stream) corresponding to specific time frame t; p( ) represents a probability function; $y_t$ represents a feature value of the MFCC stream corresponding to the specific time frame t. After the LLR value is calculated, the processor 130 (or the user authentication circuit 124) identifies the calculated LLR value as the GMM-UBM score corresponding to the sound signal stream.

Next, in step S36, the processor 130 (or the user authentication circuit 124) determines whether the sound signal stream passes a voice command authentication according to the GMM-UBM score, the DTW distance and the SNR value. The detail of step S36 would be described by FIGS. 4A-4B.

Figure 4A:
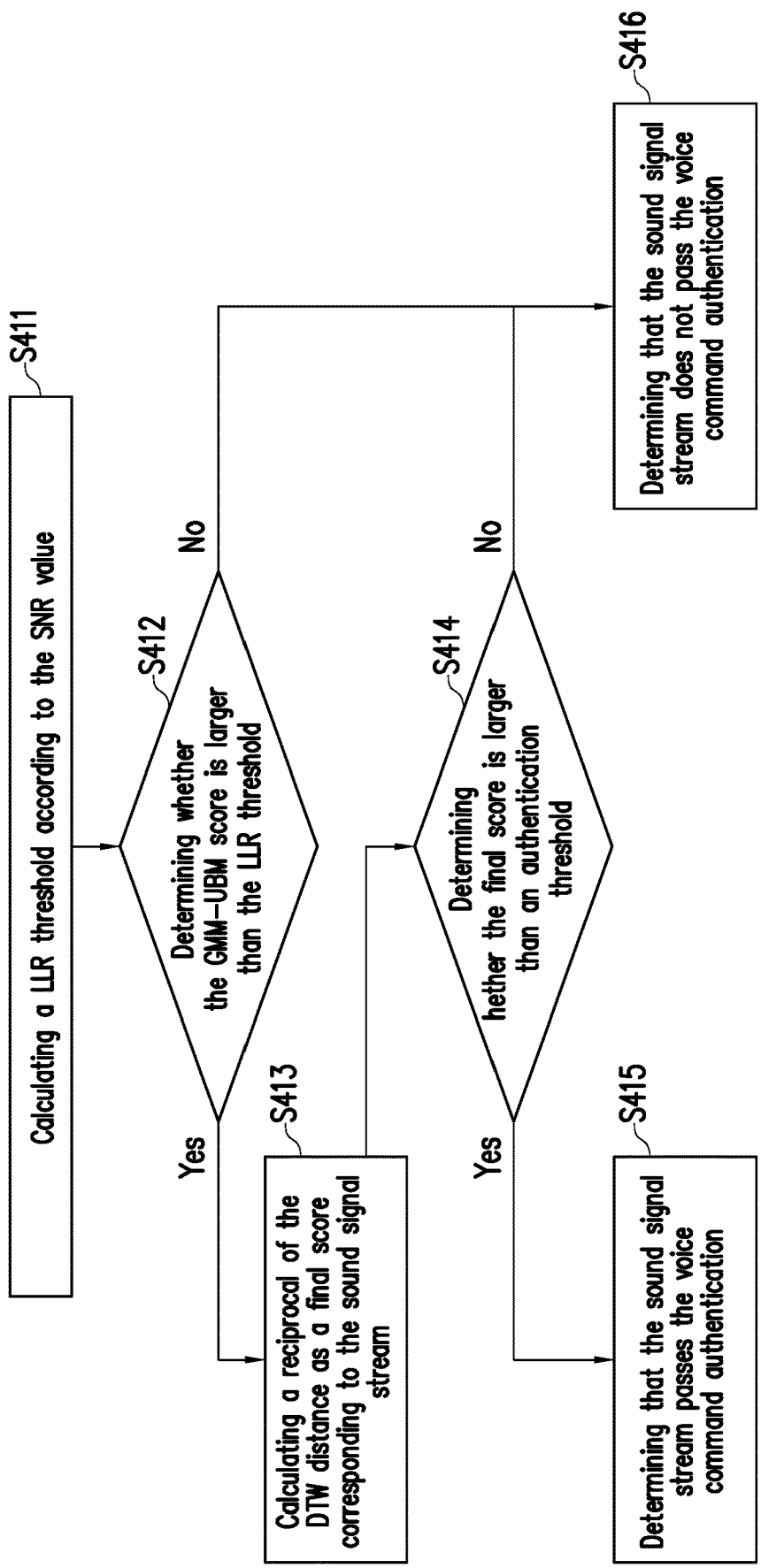
FIG. 4A shows a flow chart of step S36 in FIG. 3 according to an embodiment of the invention.

FIG. 4A shows a flow chart of step S36 in FIG. 3 according to an embodiment of the invention. Referring to FIG. 4A, in this embodiment, step S36 includes steps S411-S416.

Specifically, in step S411, the processor 130 (or the user authentication circuit 124) calculates a LLR threshold according to the SNR value.

In more detail, the LLR threshold is calculated by multiplying a threshold (also referred to as constant "C") with a SNR function (i.e., LLR threshold=(SNR function)*C), wherein a value of the SNR function is calculated according to a first constant, a second constant, a third constant and the SNR value. The threshold is empirically found from development dataset, for example, the threshold is found as 4300.

The calculation of the value of the SNR function is based on the formula (F2) below:

$$f(SNR)=y1(x)=0.1048x^2-2.8479x+20.217 \quad (F2)$$

Where, the SNR function is "f(SNR)" or "y1(x)", and x represents the SNR value of the sound signal stream in dB. Furthermore, the first constant is 0.1048; the second constant is -2.8479; and the third constant is 20.217. Moreover, there is one constrain in this formula (F2) that the first parameter f(SNR) would be directly set to 1 in response to x (i.e., the SNR value) is larger than 14.7 (dB) (i.e., f(SNR)=1 for x>14.7 dB; LLR threhold=f(SNR)*C=C for x>14.7 dB).

After the LLR threshold is calculated, in step S412, the processor 130 (or the user authentication circuit 124) determines whether the GMM-UBM score is larger than the LLR threshold. In response to determining that the GMM-UBM score is larger than the LLR threshold (step S412→Yes), step S413 would be executed; in response to determining that the GMM-UBM score is not larger than the LLR threshold (step S412→No), step S416 would be executed. The step S412 may be referred to as "the first layer authentication".

In step S416, the processor 130 (or the user authentication circuit 124) determines that the sound signal stream does not pass the voice command authentication.

In step S413, the processor 130 (or the user authentication circuit 124) calculates a reciprocal of the DTW distance (i.e., 1/(DTW distance)) as a final score corresponding to the sound signal stream.

Next, in step S414, the processor 130 (or the user authentication circuit 124) determines whether the final score is larger than an authentication threshold. The authentication threshold may be predetermined via the experiments, e.g., the authentication threshold may be determined according to the result of the Detection Error Tradeoff curve (DET) and/or Equal Error Rate (EER) corresponding to various authentication threshold values. The step S414 may be referred to as "the second layer authentication".

In response to determining that the final score is larger than the authentication threshold, step S415 would be executed; in response to determining that the final score is not larger than the authentication threshold, step S416 would be executed.

In step S415, the processor 130 (or the user authentication circuit 124) determines that the sound signal stream passes the voice command authentication.

Figure 4B:
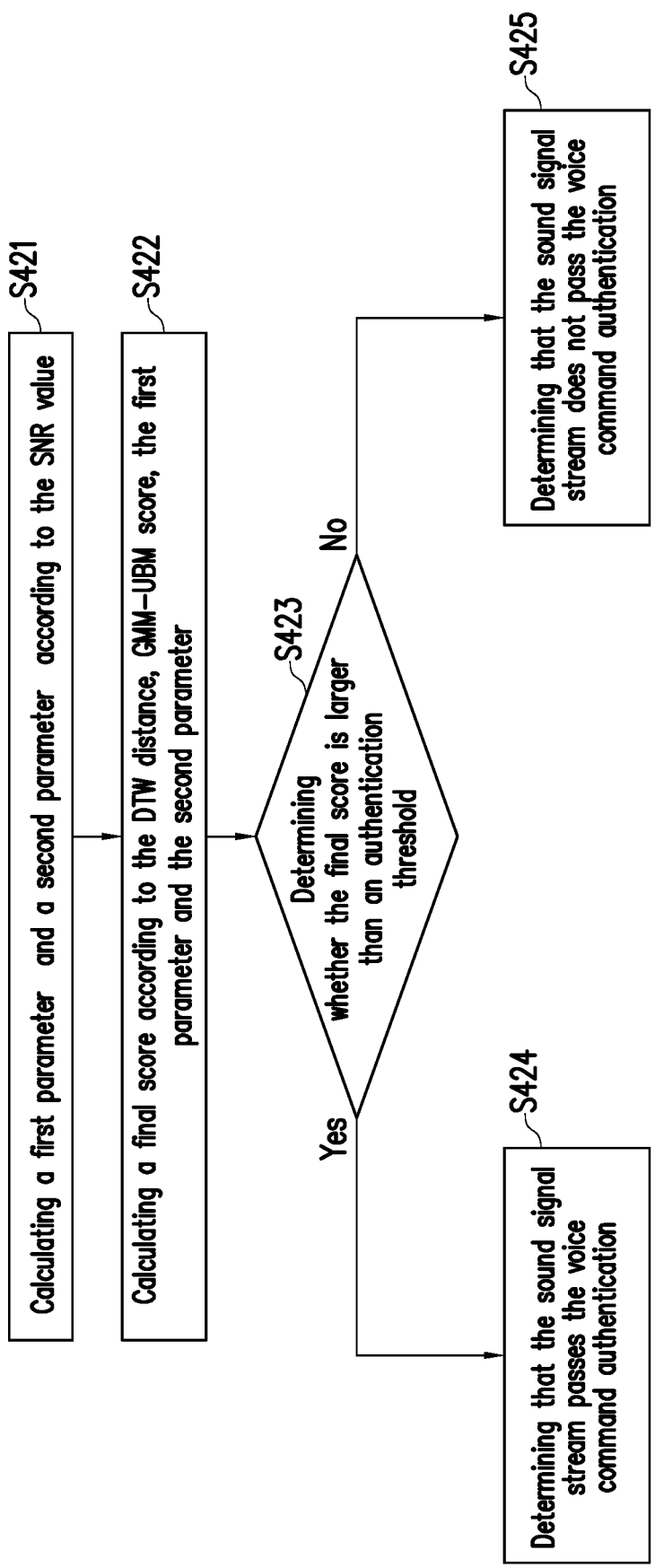
FIG. 4B shows a flow chart of step S36 in FIG. 3 according to a further embodiment of the invention.

FIG. 4B shows a flow chart of step S36 in FIG. 3 according to a further embodiment of the invention. Referring to FIG. 4B, in this embodiment, step S36 includes steps S421-S426.

Specifically, in step S421, the processor 130 (or the user authentication circuit 124) calculates a first parameter and a second parameter according to the SNR value. In more detail, the first parameter is calculated by multiplying a threshold with a SNR function, wherein a value of the SNR function is calculated according to a first constant, a second constant, a third constant and the SNR value. The first parameter is the LLR threshold (i.e., f(SNR)*C) described in the embodiment of FIG. 4A, and the detail of the first parameter would be omitted hereto.

The second parameter is calculated according to a fourth constant, a fifth constant and the SNR value.

Specifically, the calculation of the second parameter is based on the formula (F3) below:

$$g(SNR)=y2(x)=-30085x+450851 \quad (F3)$$

Where, the second parameter is a further SNR function (i.e., "g(SNR)" or "y2(x)"), and x represents the SNR value of the sound signal stream in dB. Furthermore, the fourth constant is -30085; the fifth constant is 450851. Moreover, there are two constrains in this formula (F3): (1) the second parameter g(SNR) would be directly set to 150000 in response to x (i.e., the SNR value) is smaller than 10 (dB) (i.e., g(SNR)=150000 for x<10 dB); (2) the second parameter g(SNR) would be directly set to twice of the first parameter in response to x (i.e., the SNR value) is larger than 14.7 (dB) (i.e, g(SNR)=2*f(SNR)*C for x>14.7 dB).

After the first parameter and the second parameter are calculated, in step S422, the processor 130 (or the user authentication circuit 124) calculates a final score according to the DTW distance, the GMM-UBM score, the first parameter and the second parameter. Specifically, the final score is calculated based on the formula (F4) below:

$$\text{Final score}=[1/(DTW\ distance)]*\{[(GMM\text{-}UBM\ score)/g(SNR)]+0.5\} \quad (F4)$$

Where, the GMM-UBM score is the LLR value calculated in step S35 and the DTW distance is calculated in step S34.

After obtained the calculated final score, in step S423, the processor 130 (or the user authentication circuit 124) determines whether the final score is larger than an authentication threshold. The authentication threshold may be predetermined via the experiments, e.g., the authentication threshold may be determined according to the result of the Detection Error Tradeoff curve (DET) and/or Equal Error Rate (EER) corresponding to various authentication threshold values.

In response to determining that the final score is larger than the authentication threshold, step S424 would be executed; in response to determining that the final score is not larger than the authentication threshold, step S425 would be executed.

In step S424, the processor 130 (or the user authentication circuit 124) determines that the sound signal stream passes the voice command authentication. In step S425, the processor 130 (or the user authentication circuit 124) determines that the sound signal stream does not pass the voice command authentication.

Referring back to FIG. 3, in response to determining that the sound signal stream passes the voice command authentication (S36→Yes), the step S37 would be executed; in response to determining that the sound signal stream does not pass the voice command authentication (S36→No), the step S38 would be executed.

In step S37, the processor 130 (or the user authentication circuit 124) determines that the sound signal stream is a voice stream spoken from a legal user. In other words, the processor 130 (or the user authentication circuit 124) may approve the voice command(s) spoken by this authorized legal user (e.g., the user registered during the enrollment described in the embodiment of FIG. 2).

In step S38, the processor 130 (or the user authentication circuit 124) determines that the sound signal stream is the voice stream spoken from an illegal user. In other words, the processor 130 (or the user authentication circuit 124) may reject the voice command(s) spoken by this illegal user (e.g., the user didn't register during the enrollment described in the embodiment of FIG. 2).

Figure 5:
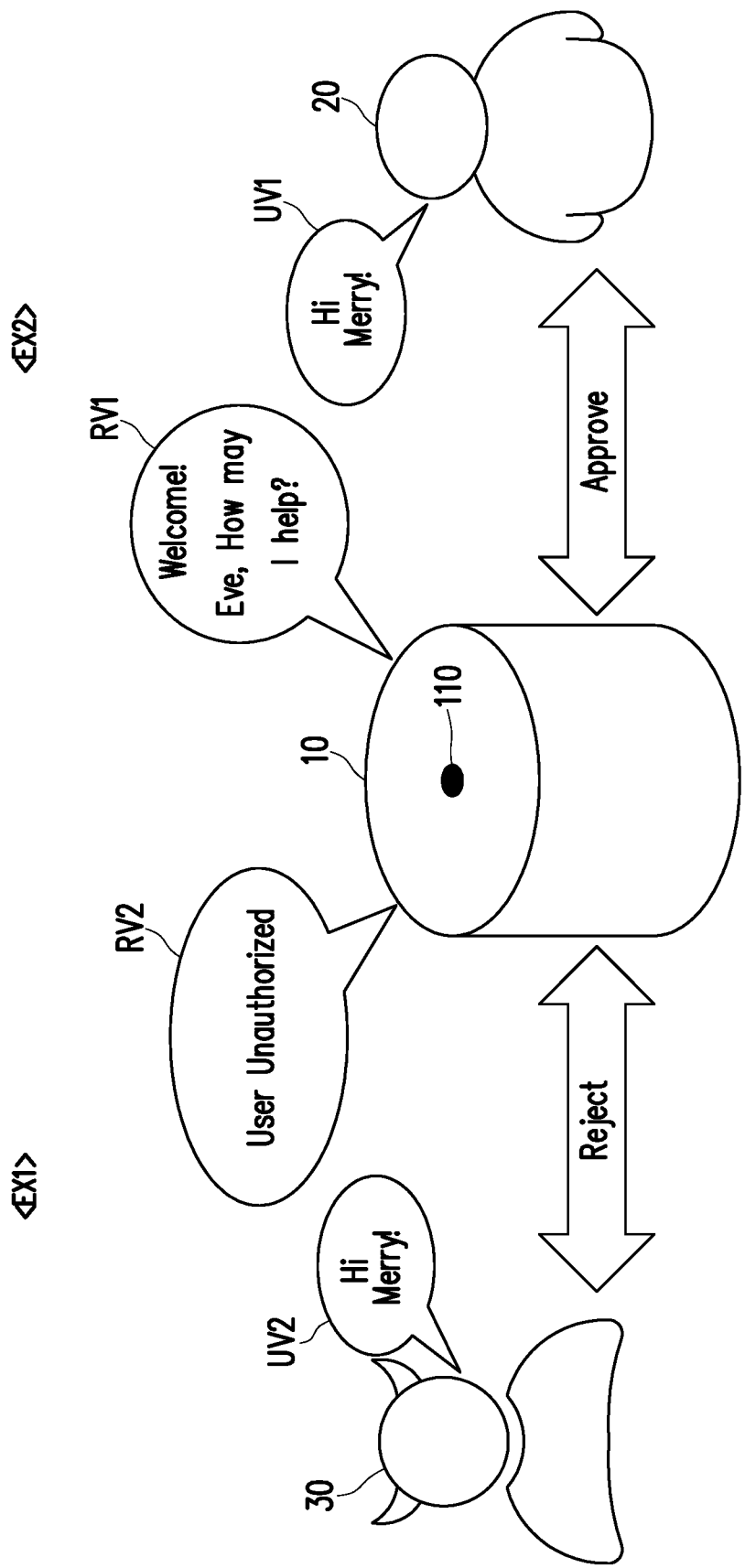
FIG. 5 shows a schematic diagram of the result of determining the voice command spoken by an illegal user or a legal user according to an embodiment of the invention.

FIG. 5 shows a schematic diagram of the result of determining the voice command spoken by an illegal user or a legal user according to an embodiment of the invention. Referring to FIG. 5, in example <EX1>, assuming that user 30 speaks a voice (command) UV2, and the electronic device 10 determines that this voice UV2 is not the voice command spoken by a legal user and then rejects the voice UV2. The processor 130 (or the user authentication circuit 124) may further instruct the I/O device 150 to play (or display) a media content which indicates the rejection (e.g., the electronic device 10 responds by playing the voice content RV2 "User unauthorized").

In example <EX2>, assuming that user 20 speaks a voice (command) UV1, and the electronic device 10 determines that this voice UV1 is the voice command spoken by a legal user "Eve" and then approves the voice UV1. The processor 130 (or the user authentication circuit 124) may give the control right to the voice command(s) spoken by this legal user (authorized/enrolled user). The processor 130 (or the user authentication circuit 124) may further instruct the I/O device 150 to play (or display) a media content which indicates the approval (e.g., the electronic device 10 responds by playing the voice content RV1 "Welcome! Eve, How may I help?").

Figure 6B:
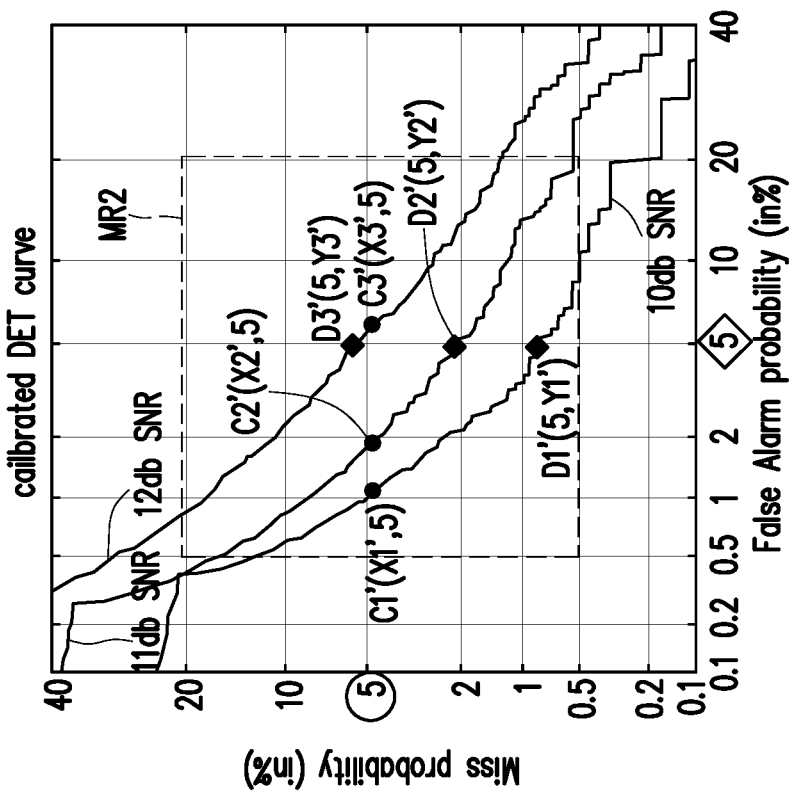
FIG. 6B shows a schematic diagram of the Detection Error Tradeoff curves (DET) of the voice recognition applied the voice command method provide by an embodiment of the invention.
Figure 6A:
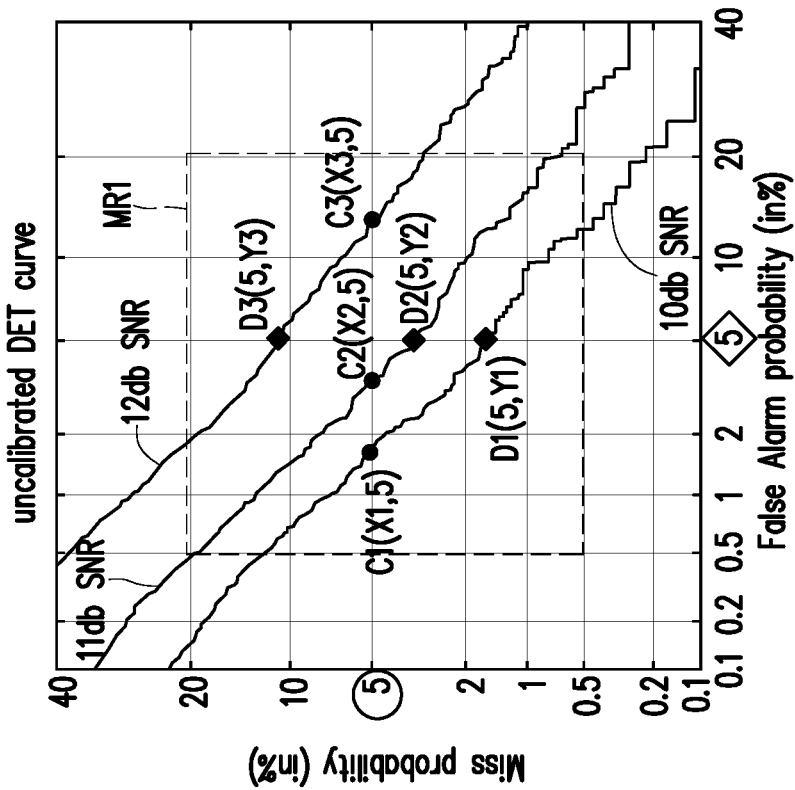
FIG. 6A shows a schematic diagram of the Detection Error Tradeoff curves (DET) of the voice recognition applied the conventional GMM-UBM method.

FIG. 6A shows a schematic diagram of the Detection Error Tradeoff curves (DET) of the voice recognition applied the conventional GMM-UBM method. FIG. 6B shows a schematic diagram of the Detection Error Tradeoff curves (DET) of the voice recognition applied the voice command method provide by an embodiment of the invention. Referring to FIG. 6A and FIG. 6B together, it is obvious that, regarding the moderate region MR1 in FIG. 6A and the moderate region MR2 in FIG. 6B, the performance of the voice recognition/authentication is improved. It should be mentioned that the calibrated DET curves FIG. 6B are obtained via the inventive GMM-UBM method provided by the foregoing embodiment.

For example, in the moderate region MR1 in FIG. 6A, for "Miss probability" 5%, point C1 (X1, 5) is on the DET curve of sound signal stream having 10 dB SNR; point C2 (X2, 5) is on the DET curve of sound signal stream having 11 dB SNR; point C3 (X3, 5) is on the DET curve of sound signal stream having 12 dB SNR. Furthermore, in the moderate region MR2 in FIG. 6B, for "Miss probability" 5%, point C1' (X1', 5) is on the DET curve of sound signal stream having 10 dB SNR; point C2' (X2', 5) is on the DET curve of sound signal stream having 11 dB SNR; point C3' (X3', 5) is on the DET curve of sound signal stream having 12 dB SNR. By comparing the x coordinate (representing the false alarm probability) of the points regarding to "Miss probability" 5%, we may find that X1' is smaller than X1, X2' is smaller than X2 and X3' is smaller than X3. In other words, under the same miss probability circumstances (e.g., 5%), the false alarm probability would be decreased (the performance is improved) via the inventive GMM-UBM method provided by the embodiment of the presented invention.

For a further example, in the moderate region MR1 in FIG. 6A, for "False Alarm probability" 5%, point D1 (5, Y1) is on the DET curve of sound signal stream having 10 dB SNR; point D2 (5, Y2) is on the DET curve of sound signal stream having 11 dB SNR; point D3 (5, Y3) is on the DET curve of sound signal stream having 12 dB SNR. Furthermore, in the moderate region MR2 in FIG. 6B, for "False Alarm probability" 5%, point D1' (5, Y1') is on the DET curve of sound signal stream having 10 dB SNR; point D2' (5, Y2') is on the DET curve of sound signal stream having 11 dB SNR; point D3' (5, Y3') is on the DET curve of sound signal stream having 12 dB SNR. By comparing the y coordinate (representing the miss probability) of the points regarding to "False Alarm probability" 5%, we may find that Y1' is smaller than Y 1, Y2' is smaller than Y2 and Y3' is smaller than Y3. In other words, under the same false alarm probability circumstances (e.g., 5%), the miss probability would be decreased (the performance is improved) via the inventive GMM-UBM method provided by the embodiment of the presented invention.

It should be noted that, according to FIGS. 6A and 6B, we may find the evidences that the "False Alarm probability" and the "Miss probability" in the voice recognition/authentication procedure would be decreased by applying the improved GMM-UBM method provided in the embodiments of the present invention, such that the accuracy of the voice command recognition/authentication is increased and overall performance of the electronic device is improved.

Based on the foregoing embodiment, the provided computer-implement voice command authentication method and the electronic device using the same are capable of calculating a SNR of the obtained sound signal stream, calculating a LLR value as a GMM-UBM score corresponding to the sound signal stream according to the MFCC stream corresponding to the sound signal stream and the sample stream generated by GMM-UBM, and determining whether the sound signal stream is a voice stream spoken from a legal user or an illegal user by determining whether the sound signal stream passes a voice command authentication according to the GMM-UBM score, the corresponding DTW distance and the SNR value, such that the ability for resisting the noise in the sound signal stream would be increased and the accuracy of the authentication for the voice command (the sounds received by the microphone device) would be improved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A computer-implement voice command authentication method, comprising:
   obtaining a sound signal stream;
   calculating a Signal-to-Noise Ratio (SNR) value of the sound signal stream;
   converting the sound signal stream into a Mel-Frequency Cepstral Coefficients (MFCC) stream;

calculating a Dynamic Time Warping (DTW) distance corresponding to the MFCC stream according to the MFCC stream and one of a plurality of sample streams generated by a Gaussian Mixture Model with Universal Background Model (GMM-UBM);

calculating, according to the MFCC stream and the sample streams, a Log-likelihood ratio (LLR) value corresponding to the MFCC stream as a GMM-UBM score corresponding to the sound signal stream;

determining whether the sound signal stream passes a voice command authentication according to the GMM-UBM score, the DTW distance and the SNR value;

in response to determining that the sound signal stream passes the voice command authentication, determining that the sound signal stream is a voice stream spoken from a legal user; and in response to determining that the sound signal stream does not pass the voice command authentication, determining that the sound signal stream is the voice stream spoken from an illegal user.

2. The voice command authentication method according to claim 1, further comprising:

in response to determining that the sound signal stream is the voice stream spoken from the legal user, granting a voice command right to one or more other voice streams spoken from the legal user; and in response to determining that the sound signal stream is the voice stream spoken from the illegal user, rejecting to grant the voice command right to one or more other voice streams spoken from the illegal user.

3. The voice command authentication method according to claim 2, wherein the step of determining whether the sound signal stream passes the voice command authentication according to the GMM-UBM score, the DTW distance and the SNR value comprising:

calculating a LLR threshold according to the SNR value;

determining whether the GMM-UBM score is larger than the LLR threshold;

in response to determining that the GMM-UBM score is larger than the LLR threshold, calculating a reciprocal of the DTW distance as a final score corresponding to the sound signal stream;

determining whether the final score is larger than an authentication threshold; and in response to determining that the final score is larger than the authentication threshold, determining that the sound signal stream passes the voice command authentication.

4. The voice command authentication method according to claim 3, wherein the step of determining whether the sound signal stream passes the voice command authentication according to the GMM-UBM score, the DTW distance and the SNR value further comprising:

in response to determining that the GMM-UBM score is not larger than the LLR threshold, determining that the sound signal stream does not pass the voice command authentication; and in response to determining that the final score is not larger than the authentication threshold, determining that the sound signal stream does not pass the voice command authentication.

5. The voice command authentication method according to claim 3, wherein the LLR threshold is calculated by multiplying a threshold with a SNR function, wherein a value of the SNR function is calculated according to a first constant, a second constant, a third constant and the SNR value, wherein in response to the SNR value is larger than 14.7 dB, the value of the SNR function is directly set to 1.

6. The voice command authentication method according to claim 2, wherein the step of determining whether the sound signal stream passes the voice command authentication according to the GMM-UBM score, the DTW distance and the SNR value comprising:

calculating a first parameter and a second parameter according to the SNR value;

calculating a final score according to the DTW distance, the GMM-UBM score, the first parameter and the second parameter;

determining whether the final score is larger than an authentication threshold; and in response to determining that the final score is larger than the authentication threshold, determining that the sound signal stream passes the voice command authentication.

7. The voice command authentication method according to claim 6, wherein the step of determining whether the sound signal stream passes the voice command authentication according to the GMM-UBM score, the DTW distance and the SNR value further comprising:

in response to determining that the final score is not larger than the authentication threshold, determining that the sound signal stream does not pass the voice command authentication.

8. The voice command authentication method according to claim 6, wherein the first parameter is calculated by multiplying a threshold with a SNR function, wherein a value of the SNR function is calculated according to a first constant, a second constant, a third constant and the SNR value, wherein in response to the SNR value is larger than 14.7 dB, the value of the SNR function is directly set to 1, wherein the second parameter is calculated according to a fourth constant, a fifth constant and the SNR value, wherein in response to the SNR value is larger than 14.7 dB, the second parameter is directly set to twice of the first parameter.

9. An electronic device, comprising:

a microphone device, wherein the microphone device receives sounds to generate a sound signal stream;

a storage device, configured to store programs and a plurality of sample streams generated by a Gaussian Mixture Model with Universal Background Model (GMM-UBM); and a processor, configured to execute the programs to implement a voice command authentication method, wherein the processor calculates a Signal-to-Noise Ratio (SNR) value of the sound signal stream, wherein the processor converts the sound signal stream into a Mel-Frequency Cepstral Coefficients (MFCC) stream, wherein the processor calculates a Dynamic Time Warping (DTW) distance corresponding to the MFCC stream according to the MFCC stream and one of the sample streams, wherein the processor calculates according to the MFCC stream and the sample streams, a Log-likelihood ratio (LLR) value corresponding to the MFCC stream as a GMM-UBM score corresponding to the sound signal stream, wherein the processor determines whether the sound signal stream passes a voice command authentication according to the GMM-UBM score, the DTW distance and the SNR value, wherein in response to determining that the sound signal stream passes the voice command authentication, the processor determines that the sound signal stream is a voice stream spoken from a legal user, wherein in response to determining that the sound signal stream does not pass the voice command authentication, the processor determines that the sound signal stream is the voice stream spoken from an illegal user.

10. The electronic device according to claim 9, wherein in response to determining that the sound signal stream is the voice stream spoken from the legal user, the processor grants a voice command right to one or more other voice streams spoken from the legal user, in response to determining that the sound signal stream is the voice stream spoken from the illegal user, wherein the processor rejects to grant the voice command right to one or more other voice streams spoken from the illegal user.

11. The electronic device according to claim 10, wherein in the operation of the processor determines whether the sound signal stream passes the voice command authentication according to the GMM-UBM score, the DTW distance and the SNR value, the processor calculates a LLR threshold according to the SNR value, wherein the processor determines whether the GMM-UBM score is larger than the LLR threshold, wherein in response to determining that the GMM-UBM score is larger than the LLR threshold, the processor calculates a reciprocal of the DTW distance as a final score corresponding to the sound signal stream, wherein the processor determines whether the final score is larger than an authentication threshold, wherein in response to determining that the final score is larger than the authentication threshold, the processor determines that the sound signal stream passes the voice command authentication.

12. The electronic device according to claim 11, wherein in the operation of the processor determines whether the sound signal stream passes the voice command authentication according to the GMM-UBM score, the DTW distance and the SNR value, in response to determining that the GMM-UBM score is not larger than the LLR threshold, the processor determines that the sound signal stream does not pass the voice command authentication, wherein in response to determining that the final score is not larger than the authentication threshold, the processor determines that the sound signal stream does not pass the voice command authentication.

13. The electronic device according to claim 11, wherein the LLR threshold is calculated by multiplying a threshold with a SNR function, wherein a value of the SNR function is calculated according to a first constant, a second constant, a third constant and the SNR value, wherein in response to the SNR value is larger than 14.7 dB, the value of the SNR function is directly set to 1.

14. The electronic device according to claim 10, wherein in the operation of the processor determines whether the sound signal stream passes the voice command authentication according to the GMM-UBM score, the DTW distance and the SNR value, the processor calculates a first parameter and a second parameter according to the SNR value, wherein the processor calculates a final score according to the DTW distance, the GMM-UBM score, the first parameter and the second parameter, wherein the processor determines whether the final score is larger than an authentication threshold, wherein in response to determining that the final score is larger than the authentication threshold, the processor determines that the sound signal stream passes the voice command authentication.

15. The electronic device according to claim 14, wherein in the operation of the processor determines whether the sound signal stream passes the voice command authentication according to the GMM-UBM score, the DTW distance and the SNR value, in response to determining that the final score is not larger than the authentication threshold, the processor determines that the sound signal stream does not pass the voice command authentication.

16. The electronic device according to claim 14, wherein the first parameter is calculated by multiplying a threshold with a SNR function, wherein a value of the SNR function is calculated according to a first constant, a second constant, a third constant and the SNR value, wherein in response to the SNR value is larger than 14.7 dB, the value of the SNR function is directly set to 1, wherein the second parameter is calculated according to a fourth constant, a fifth constant and the SNR value, wherein in response to the SNR value is larger than 14.7 dB, the second parameter is directly set to twice of the first parameter.

* * * * *